(12) United States Patent
Barajas Gonzalez et al.

(10) Patent No.: US 10,832,573 B2
(45) Date of Patent: Nov. 10, 2020

(54) MODIFYING TRAVEL ESTIMATES BASED ON SCHEDULE ANXIETY

(71) Applicant: International Business Machines Corporation, Armonk, NY (US)

(72) Inventors: Emmanuel Barajas Gonzalez, Guadalajara (MX); Shaun E. Harrington, Sahuarita, AZ (US); Benjamin K. Rawlins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 15/808,562

(22) Filed: Nov. 9, 2017

(65) Prior Publication Data

US 2018/0068563 A1 Mar. 8, 2018

Related U.S. Application Data

(63) Continuation-in-part of application No. 14/594,831, filed on Jan. 12, 2015, now abandoned.

(51) Int. Cl.
*G08G 1/0968* (2006.01)
*G08G 1/0967* (2006.01)
(Continued)

(52) U.S. Cl.
CPC ... *G08G 1/096855* (2013.01); *G01C 21/3407* (2013.01); *G01C 21/3484* (2013.01);
(Continued)

(58) Field of Classification Search
CPC ........... G08G 1/096855; G08G 1/0967; G08G 1/09626
See application file for complete search history.

(56) References Cited

U.S. PATENT DOCUMENTS 6,144,917 A   11/2000   Walters et al.
6,317,686 B1  11/2001   Ran
(Continued)

FOREIGN PATENT DOCUMENTS

JP   2013200158 A   10/2013
WO    02/08922 A1    1/2002

OTHER PUBLICATIONS

"A Method for Social Collaborative Navigation in a Dynamic Environment", Mar. 12, 2012, Database: IP.COM, IP.COM No. IPCOM000215796D.
(Continued)

*Primary Examiner* — Jeffrey C Boomer
(74) *Attorney, Agent, or Firm* — Kunzler Bean & Adamson

(57) ABSTRACT

For modifying travel estimates, a memory stores maps and a plurality of travel records. A measurement circuit determines travel parameters. A current schedule anxiety is calculated as a difference between a nonzero constant value and the relative arrival time. The memory stores the travel parameters to a travel record of the plurality of travel records each time a specified driver drives to a location. A modification circuit modifies an arrival time travel estimate based on a driver profile for the specified driver calculated from the travel parameters and the plurality of travel records. The modification circuit further updates the driver profile in the memory with the current schedule anxiety and the speed based on current schedule anxiety. A display presents the modified arrival time estimate.

20 Claims, 8 Drawing Sheets

(51) Int. Cl.
*G01C 21/34* (2006.01)
*G08G 1/0962* (2006.01)

(52) U.S. Cl.
CPC ....... *G01C 21/3492* (2013.01); *G08G 1/0967* (2013.01); *G08G 1/09626* (2013.01)

(56) References Cited

U.S. PATENT DOCUMENTS

| | | |
|---|---|---|
| 7,236,881 B2 | 6/2007 | Liu et al. |
| 8,175,802 B2 | 5/2012 | Forstall et al. |
| 8,364,395 B2 | 1/2013 | French et al. |
| 8,452,529 B2 | 5/2013 | Alten |
| 8,712,682 B1 | 4/2014 | Liu et al. |
| 8,825,376 B1 | 9/2014 | Szybalski et al. |
| 2010/0057360 A1 | 3/2010 | Ohkubo |
| 2010/0082241 A1 | 4/2010 | Trivedi |
| 2010/0100310 A1 | 4/2010 | Eich et al. |
| 2011/0077548 A1 | 3/2011 | Torch |
| 2011/0130950 A1 | 6/2011 | Wexler et al. |
| 2011/0264363 A1 | 10/2011 | Cabral |
| 2012/0158285 A1 | 6/2012 | Yamazaki et al. |
| 2015/0345984 A1 | 12/2015 | Graham |
| 2015/0346348 A1 | 12/2015 | Liu et al. |
| 2015/0350413 A1 | 12/2015 | Ma et al. |
| 2016/0011001 A1 | 1/2016 | Emory et al. |
| 2016/0018969 A1 | 1/2016 | Sundarraman et al. |

OTHER PUBLICATIONS

STIC, "EIC 3600 Search Report", dated May 24, 2016, 17 pages.

205 ↙

| Driver 207 |
| Speed Limit 210 |
| Speed 215 |
| Weather 220 |
| Road Condition 225 |
| Traffic 230 |
| Time of Day 235 |
| Schedule Anxiety 240 |
| Destination Type 245 |
| Driver Ancillary Actions 250 |
| Driver Mood 255 |

| Current Speed Limit 310 |
| Current Speed 315 |
| Current Weather 320 |
| Current Road Condition 325 |
| Current Traffic 330 |
| Current Time of Day 335 |
| Current Schedule Anxiety 340 |
| Current Destination Type 345 |
| Current Driver Ancillary Actions 350 |
| Current Driver Mood 355 |

| Speed based on Speed Limit 410 |
|---|
| Speed based on Weather 420 |
| Speed based on Road Condition 425 |
| Speed based on Traffic 430 |
| Speed based on Time of Day 435 |
| Speed based on Current Schedule Anxiety 440 |
| Speed based on Destination Type 445 |
| Speed based Driver Ancillary Actions 450 |
| Speed based on Driver Mood 455 |

MODIFYING TRAVEL ESTIMATES BASED ON SCHEDULE ANXIETY

CROSS-REFERENCE TO RELATED APPLICATIONS

This application is a continuation-in-part of and claims priority to U.S. patent application Ser. No. 14/594,831 entitled "MODIFYING TRAVEL ESTIMATES" and filed on Jan. 12, 2015 for Emmanuel B. Gonzalez, which is incorporated herein by reference.

FIELD

The subject matter disclosed herein relates to travel estimates and more particularly relates to modifying travel estimates.

BACKGROUND

Travel estimates are often based only on speed limits or current speeds.

BRIEF SUMMARY

A dedicated navigation device for modifying travel estimates is disclosed. The device includes a display, a global positioning system (GPS), a memory, a clock, a camera, a custom hardware measurement circuit, a memory, and a custom hardware modification circuit. The memory stores maps and a plurality of travel records. The measurement circuit determines travel parameters comprising a current speed limit, current weather, a current road condition, current traffic, a current time of day, and a current schedule anxiety. The current speed limit is measured using the GPS to determine a current location and the current speed limit is retrieved from the map for the current location. The current traffic is determined from the camera. The current time of day is determined from the clock. The current weather is interpreted from an optical image from the camera. A relative arrival time is calculated as an inverse of a late arrival time. The current schedule anxiety is calculated as a difference between a nonzero constant value and the relative arrival time. The memory stores the travel parameters to a travel record of the plurality of travel records each time a specified driver drives to a location. The modification circuit modifies an arrival time travel estimate based on a driver profile for the specified driver calculated from the travel parameters and the plurality of travel records. The driver profile comprises a speed based on a speed limit, a speed based on weather, a speed based on road conditions, a speed based on traffic, a speed based on time of day, and a speed based on current schedule anxiety. The speed based on current schedule anxiety SA is calculated as $SA = k \cdot CSL \cdot CA / (\Sigma(SI \cdot AI/N))$ where k is a nonzero constant, CSL is the current speed limit, SI is the speed for a travel record of a plurality of travel records, CA is the current schedule anxiety, AI is the schedule anxiety for the travel record, and N is a number of the plurality of travel records. The modification circuit further updates the driver profile in the memory with the current schedule anxiety and the speed based on current schedule anxiety. The display presents the modified arrival time estimate. A method and system also perform the functions of the device.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2B is a schematic block diagram illustrating one embodiment of a travel record;

FIG. 2C is a schematic block diagram illustrating one embodiment of travel parameters;

DETAILED DESCRIPTION

Figure 1A:
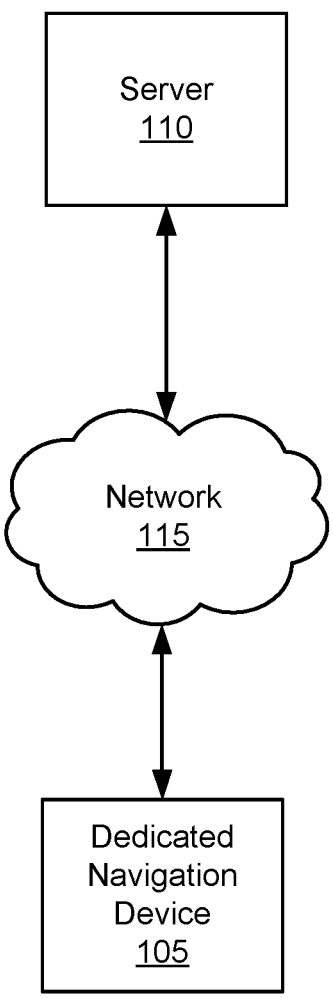
FIG. 1A is a schematic block diagram illustrating one embodiment of a travel estimate system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1A is a schematic block diagram illustrating one embodiment of a travel estimate system 100. The system 100 may estimate travel times. The system 100 includes a server 110, a network 115, and a dedicated navigation device 105. The dedicated navigation device 105 may be a mobile phone, a tablet computer, a laptop computer, or a dedicated navigation device. The dedicated navigation device 105 may communicate through the network 115 with the server 110. The network 115 may be the Internet, a mobile telephone network, a Wi-Fi network, or combinations thereof.

The electronic device 115 may estimate travel times to target points such as a destination and/or one or more waypoints. In the past, the estimated travel times would be based on standard metrics such as speed limits. Unfortunately, the persona of the driver may significantly affect travel times. For example, some drivers typically drive faster than a posted speed limit. Other drivers may drive faster when they are late for an appointment. Traffic, road conditions, and whether may also affect drivers differently. The embodiments described herein modify a travel estimate based on the persona of the driver.

Figure 1B:
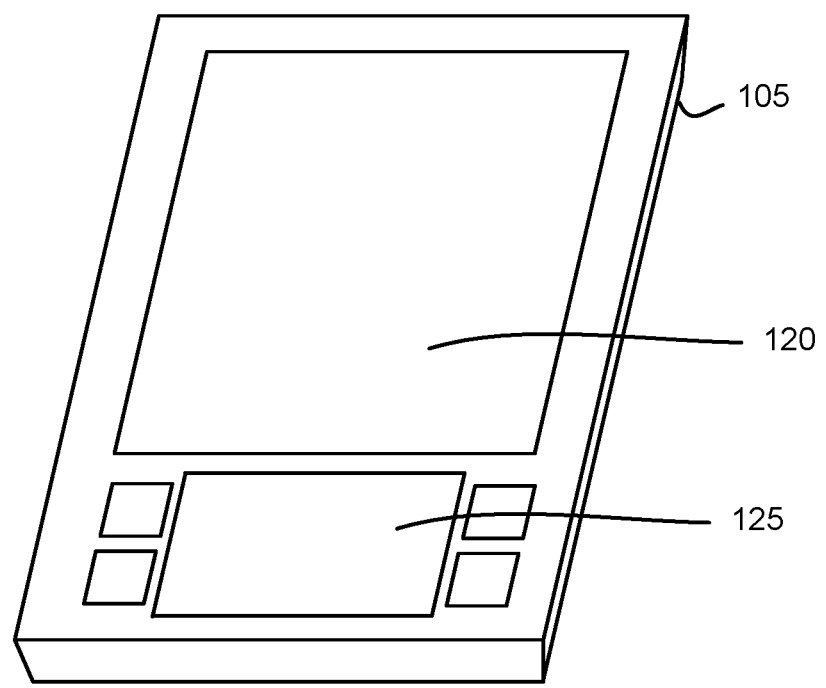
FIG. 1B is a perspective drawing illustrating one embodiment of a dedicated navigation device.

FIG. 1B is a perspective drawing illustrating one embodiment of a dedicated navigation device 105. The dedicated navigation device 105 includes a display 120 and one or more controls 125.

Figure 2A:
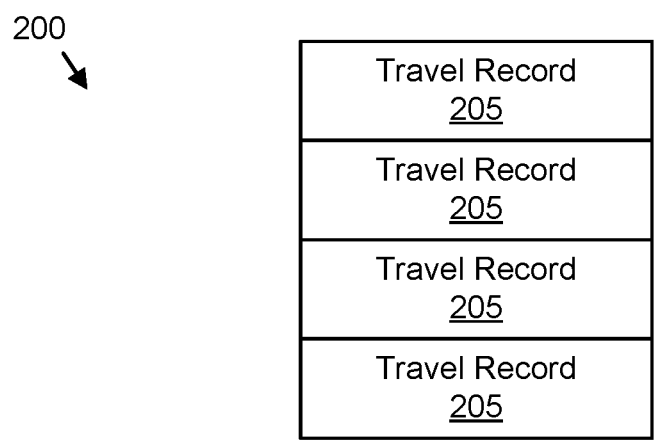
FIG. 2A is a schematic block diagram illustrating one embodiment of a travel database.

FIG. 2A is a schematic block diagram illustrating one embodiment of a travel database 200. The travel database 200 may be organized as a data structure on a memory. The travel database 200 may include a plurality of travel records 205. In one embodiment, one or more travel record 205 is recorded each time the dedicated navigation device 105 travels. Alternatively, travel record 205 may be recorded each time the dedicated navigation device 105 is used to navigate to a location. In a certain embodiment, the travel record 205 is recorded each time a specified driver drives to a location.

FIG. 2B is a schematic block diagram illustrating one embodiment of a travel record 205. The travel record 205 may also be organized as a data structure on the memory. In the depicted embodiment, the travel record 205 includes a driver 207, a speed limit 210, a speed 215, weather 220, a road condition 225, traffic 230, a time of day 235, a schedule anxiety 240, a destination type 245, driver ancillary actions 250, and driver mood 255.

The driver 207 may identify a driver of a vehicle, a cyclist, a runner, a walker, or the like. In one embodiment, the driver 207 is the owner of the electronic device 205.

The speed limit 210 may record a speed limit for a section of road over which the dedicated navigation device 105 is traveling. The speed limit 210 may be determined from an electronic map, optical recognition of a speed limit sign, or the like.

The speed 215 may be the speed at which the dedicated navigation device 105 is traveling. The speed 215 may be calculated as a time between positions. The positions may be measured using a global positioning system (GPS) or the like.

The weather 220 may record weather for a section of road over which the dedicated navigation device 105 is traveling. As used herein, road may refer to a path, a course, and/or a route. The weather may be recorded from a weather status downloaded from the server 110, interpreted from an optical image, or received from external weather sensors. For example, snowy weather may be interpreted from an image of falling snow. In one embodiment, the weather 220 is recorded as a numerical value based on an arbitrary scale such as 0-1 where 0 is impassable due to weather and 1 is no weather-related impediments.

The road condition 225 may record a condition of the section of the road over which the dedicated navigation device 105 is traveling. The road condition 225 may be determined from the electronic map, interpreted from an optical image, or specified by the driver. In one embodiment, the road condition 225 is recorded as a numerical value based on an arbitrary scale such as 0-1 where 0 is impassable and 1 is equivalent to freeway.

The traffic 230 may record traffic on the section of the road over which the dedicated navigation device 105 is traveling. The traffic 230 may be downloaded from the server 110, interpreted from the optical image, or specified by the driver. In one embodiment, the traffic 230 is recorded as a numerical value based on an arbitrary scale such as 0-1 where 0 is impassable and 1 is no congestion.

The time of day 235 may be a timestamp. In one embodiment, the time of day 235 is generalized to a day of the week and an hour of the day.

The schedule anxiety 240 may be calculated based on a scheduled activity such as a meeting or an appointment. The start time of the scheduled activity may be compared to an estimated arrival time at the scheduled activity. The schedule anxiety SA 240 may be calculated using Equation 1, where k is a nonzero constant such as 20 minutes and RAT is a relative arrival time.

$$SA = k - RAT \qquad \text{Equation 1}$$

The destination type 245 may describe the destination. The destination type 245 may be one of a business destination, a date, a social engagement, a sporting event, a recreation destination, a retail destination, an entertainment destination, a dinner destination, or the like.

The driver ancillary actions 250 may describe non-driving actions of the driver on the section of the road over which the dedicated navigation device 105 is traveling. The driver ancillary actions 250 may include a type of music listened to, a type of talk radio program listened to, a type of book listened to, and a type of telephone conversation. In one embodiment, the driver ancillary actions 250 is recorded as a numerical value based on an arbitrary scale such as 0-1 where 0 is calm and 1 is distracted.

The driver mood 255 may describe the mood of the driver. The driver mood 255 may be determined from a heart rate of the driver, a facial expression of the driver, a skin temperature of the driver, or the like. The heart rate, facial expression, and/or skin temperature may be determined from biometric sensors, an optical camera, or the like. In one embodiment, the driver mood 255 is recorded as a numerical value based on an arbitrary scale such as 0-1 where 0 is calm and 1 is anxious.

FIG. 2C is a schematic block diagram illustrating one embodiment of travel parameters 300. The travel parameters 300 maybe organized as a data structure in the memory. The travel parameters 300 may be recorded by the dedicated navigation device 105 and/or downloaded from the server 110. In the depicted embodiment, the travel parameters 300 include a current speed limit 310, a current speed 315, current weather 320, a current road condition 325, current traffic 330, a current time of day 335, a current schedule anxiety 340, a current destination type 345, current driver ancillary actions 350, and a current driver mood 355. The current speed limit 310, current speed 315, current weather 320, current road condition 325, current traffic 330, current time of day 335, current schedule anxiety 340, current destination type 345, current driver ancillary actions 350, and current driver mood 355 may be current measurements of the speed limit 210, speed 215, weather 220, road condition 225, traffic 230, time of day 235, schedule anxiety 240, destination type 245, driver ancillary actions 250, and driver mood 255 respectively.

Figure 2D:
FIG. 2D is a schematic block diagram illustrating one embodiment of a driver profile.

FIG. 2D is a schematic block diagram illustrating one embodiment of a driver profile 400. The driver profile 400 maybe organized as a data structure in the memory. In the depicted embodiment, the driver profile 400 includes a speed based on speed limit 410, speed based on whether 420, a speed based on road condition 425, a speed based on traffic 430, a speed based on time of day 435, a speed based on current schedule anxiety 440, a speed based on destination type 445, a speed based on driver ancillary actions 450, and a speed based on driver mood 455.

The speed based on speed limit 410 may be calculated as a function of the speed limit 210 and the current speed limit 310. In addition, the speed based on speed limit 410 may also be calculated as a function of the current speed 315. In one embodiment, the speed based on speed limit SSL 410 is calculated using Equation 2, where CSL is the current speed limit 310, SI is the speed 215 for each travel record i 205, and SLI is the speed limit for each travel record i 205.

$$SSL = k*CSL*\Sigma(SI/SLI) \qquad \text{Equation 2}$$

The speed based on weather 420 may be calculated as a function of the weather 220 and the current weather 320. In one embodiment, the speed based on weather SW 420 may be calculated using Equation 3, where CW is the current weather 320 and WI is the weather 220 for travel record i 205, and N is a number of the plurality of travel records 205.

$$SW = k*CSL*CW/(\Sigma(SI*WI/N) \qquad \text{Equation 3}$$

The speed based on road condition 425 may be calculated as a function of the road condition 225 and the current road condition 325. In one embodiment, the speed based on road condition SR 425 is calculated using Equation 4, where CR is the current road condition 325 and RI is the road condition 225 for a travel record i 205.

$$SR = k*CSL*CR/(\Sigma(SI*RI/N) \qquad \text{Equation 4}$$

The speed based on traffic 430 may be calculated as a function of the traffic 230 and the current traffic 330. In one embodiment, the speed based on traffic ST 430 is calculated using Equation 5, where CT is the current traffic 330 and TI is the traffic 230 for a travel record i 205.

$$ST = k*CSL*CT/(\Sigma(SI*TI/N) \qquad \text{Equation 5}$$

The speed based on time of day 435 may be calculated as a function of the time of day 235 and the current time of day 335. In one embodiment, the speed based on time of day SD 435 is calculated using Equation 6, where CD is the current time of day 335 and DI is the time of day 235 for a travel record i 205.

$$SD = k*CSL*CD/(\Sigma(SI*DI/N) \qquad \text{Equation 6}$$

The speed based on current schedule anxiety 440 may be calculated as a function of schedule anxiety 240 and current schedule anxiety 340. In a certain embodiment, the speed based on current schedule anxiety SA 440 may be calculated using Equation 7, where CA is current schedule anxiety 340 and AI is the schedule anxiety 240 for a travel record i 205, and N is a number of the plurality of travel records 205.

$$SA = k*CSL*CA/(\Sigma(SI*AI/N) \qquad \text{Equation 7}$$

The speed based on destination type 445 may be calculated as a function of destination type 245 and current destination type 345. In one embodiment, the speed based on destination type SDT 445 is calculated using Equation 8, where CDT is the current destination type 345 for each travel record i 205 where the destination type 245 equals the current destination type 345 and M is a number of destination types 245 that equal the current destination type 345.

$$SDT = k*CSL*CDT/\Sigma(SI/M) \qquad \text{Equation 8}$$

The speed based on driver ancillary actions 450 may be calculated as a function of the driver ancillary actions 250 and the current driver ancillary actions 350. In one embodiment, the speed based on driver ancillary actions SAA 450 is calculated using Equation 9, where CAA is the current driver ancillary actions 350 for each travel record i 205 where the driver ancillary actions 250 equals the current driver ancillary actions 350 and M is a number of driver ancillary actions 250 that equal the current driver ancillary actions 350.

$$SAA = k*CSL*CAA/\Sigma(SI/M) \quad \text{Equation 9}$$

The speed based on driver mood 455 may be calculated as a function of the driver mood 255 and the current driver mood 355. In one embodiment, the speed based on driver mood 455 may be calculated using Equation 10, where CM is the current driver mood 355 and MI is the driver mood 255 for a travel record i 205.

$$SM = k*CSL*CM/(\Sigma(SI*MI/N) \quad \text{Equation 10}$$

Figure 3:
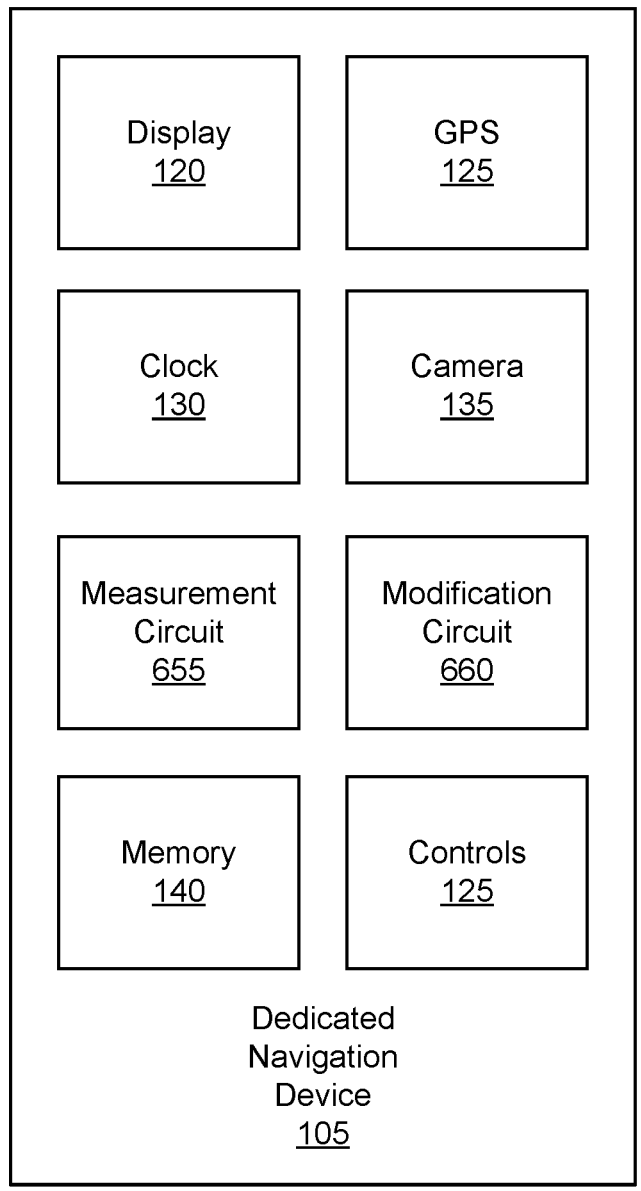
FIG. 3 is a schematic block diagram illustrating one embodiment of a dedicated navigation device.

FIG. 3 is a schematic block diagram illustrating one embodiment of the dedicated navigation device 105. In the depicted embodiment, the dedicated navigation device 105 includes the display 120, a global positioning system (GPS) 125, a clock 130, a camera 135, a measurement circuit 655, a modification circuit 660, a memory 140, and controls 125. The display 120 may present a travel estimate. The GPS 125 may determine the location of the dedicated navigation device 105. The clock 130 may generate a time. The camera 135 may capture images. The memory 140 may store data and/or code. In one embodiment, the memory 140 stores one or more maps. The controls 125 may provide inputs to the measurement circuit 655 and the modification circuit 660.

The measurement circuit 655 may be a custom hardware circuit. The function of the measurement circuit 655 is described hereafter. The modification circuit 660 may also be a custom hardware circuit. The function of the modification circuit 660 is described hereafter.

Figure 4:
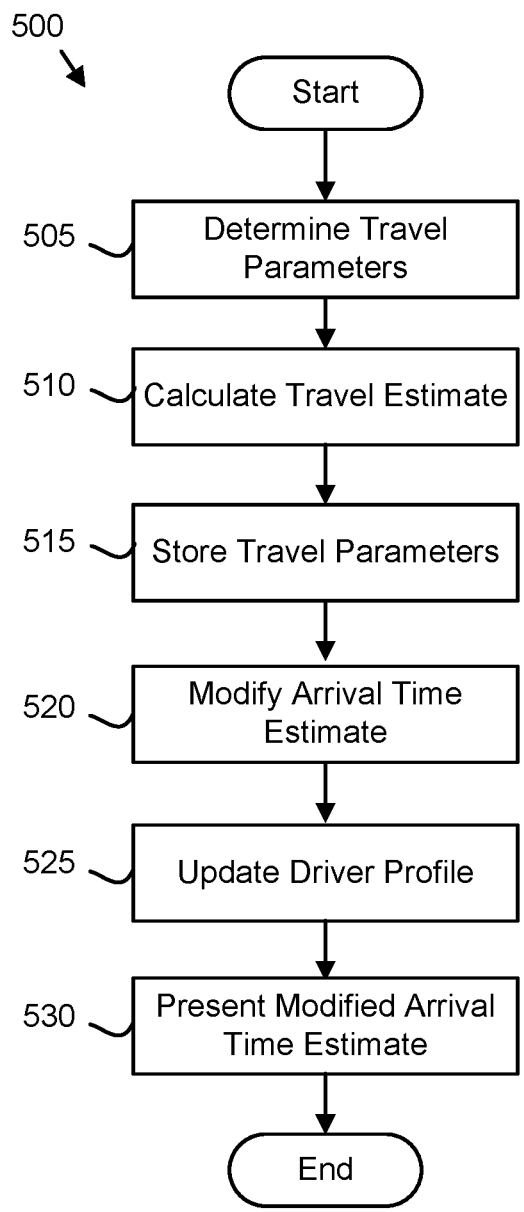
FIG. 4 is a schematic flow chart diagram illustrating one embodiment of a travel estimate modification method.

FIG. 4 is a schematic flow chart diagram illustrating one embodiment of a travel estimate modification method 500. The method 500 may be performed by the dedicated navigation device 105

The method 500 starts, and in one embodiment, the measurement circuit 655 determines 505 the travel parameters 300. The current speed limit 310 may be measured using the GPS 125 to determine a current location. The current speed limit 310 may be retrieved from a map for the current location. The current traffic 330 may be determined from the camera 135. Alternatively, the current traffic 330 may be retrieved from the server 110. The current time of day 335 may be determined from the clock 130. The current weather 320 may be interpreted from an optical image from the camera 135. Alternatively, the current weather 320 may be retrieved from the server 110.

The measurement circuit 655 may calculate a relative arrival time RAT as an inverse of a late arrival time. For example, if the dedicated navigation device 105 is estimated to arrive 15 minutes late, the relative arrival time may be minus 15 minutes. The current schedule anxiety 340 may calculated as a difference between a nonzero constant value and the relative arrival time as shown in Equation 1.

In one embodiment, the measurement circuit 655 calculates 510 a travel estimate to a target point such as a waypoint and/or a destination. In one embodiment, the travel estimate is based on speed limits along the route to the target point. Alternatively, the travel estimate may be based on a current speed.

The memory 140 may store 515 the travel parameters 300 to a travel record 205 of the plurality of travel records 205 each time a specified driver drives to a location.

The modification circuit 660 may modify 520 an arrival time travel estimate based on a driver profile 400 for the specified driver calculated from the travel parameters 300 and the plurality of travel records 205. The arrival time travel estimate may be modified 520 using the speed based on current schedule anxiety 440. The speed based on current schedule anxiety SA 440 may be calculated as shown in Equation 7.

In one embodiment, the modification circuit 660 modifies 520 the travel estimate by replacing the speed used to calculate a travel estimate such as the speed limit and/or current speed along one more segments of a route to the target point with a modified speed. The modified speed may be calculated as a function of one or more of the speed based on speed limit 410, speed based on whether 420, speed based on road condition 425, speed based on traffic 430, speed based on time of day 435, speed based on current schedule anxiety 440, speed based on destination type 445, speed based on driver ancillary actions 450, and speed based on driver mood 455. In one embodiment, the modified speed MDS is calculated using Equation 11, where a1-9 are nonzero constants.

$$MDS = a1*SSL + a2*SW + a3*SR + a4*ST + a5*SD + a6*SA + a7*SDT + a8*SAA + a9*SM \quad \text{Equation 11}$$

The nonzero constants may be modified dynamically based on actual time that the dedicated navigation device 105 arrives at the target point. For example, one nonzero constant that adds most to a discrepancy between the actual time of arrival and the travel estimate may be adjusted so that the travel estimate would have equal the actual time of arrival.

In one embodiment, the measurement circuit 655 updates 525 the driver profile 400 in the memory 140. The measure module 655 may store the travel parameters 300 as a travel record 205. In addition, the measurement circuit 655 may recalculate the driver profile 400 using the travel database 200 to update the driver profile 400.

The display 120 may present 530 the modified arrival time estimate and the method 500 ends. The embodiments modify the travel estimate based on the travel parameters 300 and the driver profile 400. As a result, the travel estimate to the target point is more accurate, increasing the travel estimate's usefulness to the user.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A dedicated navigation device comprising:
a display;
a global positioning system (GPS);
a memory storing maps and a plurality of travel records;
a clock;
a camera;
a hardware measurement circuit that determines travel parameters comprising a current speed limit, current weather, a current road condition, current traffic, a current time of day, and a current schedule anxiety, wherein the current speed limit is measured using the GPS to determine a current location and the current speed limit is retrieved from the map for the current location, the current traffic is determined from the camera, the current time of day is determined from the clock, the current weather is determined from an optical image from the camera, a relative arrival time is calculated as an inverse of a late arrival time, wherein the late arrival time is minutes that a specified driver will arrive late, and a current schedule anxiety is calculated as a difference between a nonzero constant value and the relative arrival time;

the memory stores the travel parameters to a travel record of the plurality of travel records each time a specified driver drives to a location;

a hardware modification circuit that modifies an arrival time travel estimate based on a driver profile for the specified driver calculated from the travel parameters and the plurality of travel records, the driver profile comprising a speed based on a speed limit, a speed based on weather, a speed based on the road condition, a speed based on traffic, a speed based on time of day, and a speed based on current schedule anxiety, wherein the speed based on current schedule anxiety SA is calculated as $SA=k*CSL*CA/(\Sigma(SI*AI/N))$ where k is a nonzero constant, CSL is the current speed limit, SI is the speed for a given travel record of a plurality of travel records, CA is the current schedule anxiety, AI is the schedule anxiety for the given travel record, and N is the number of the plurality of travel records;

the modification circuit further updates the driver profile in the memory with the current schedule anxiety and the speed based on the current schedule anxiety; and the display presents the modified arrival time estimate.

2. The dedicated navigation device of claim 1, wherein the modification circuit further updates the driver profile in response to the travel parameters.

3. The dedicated navigation device of claim 1, wherein the arrival time travel estimate is further modified using a modified speed, the modified speed calculated as a function of the speed based on the speed limit, the speed based on the weather, the speed based on the road condition, the speed based on traffic, and the speed based on the time of day.

4. The dedicated navigation device of claim 3, wherein the speed based on the speed limit SSL is calculated as $SSL=k*CSL*\Sigma(SI/SLI)$ where CSL is the current speed limit, SI is a speed for an ith travel record of the plurality of travel records, SLI is a speed limit for the ith travel record, and k is a nonzero constant.

5. The dedicated navigation device of claim 3, wherein the speed based on the weather SW is calculated as $SW=k*CSL*CW/(\Sigma(SI*WI/N))$, where CSL is the current speed limit, CW is the current weather, SI is a speed for an ith travel record of the plurality of travel records, WI is a weather for the ith travel record, N is the number of the plurality of travel records, and k is a nonzero constant.

6. The dedicated navigation device of claim 3, wherein the speed based on the road condition SR is calculated as $SR=k*CSL*CR/(\Sigma(SI*RI/N))$, where CSL is the current speed limit, CR is the current road condition, SI is a speed for an ith travel record of the plurality of travel records, RI is a road condition for the ith travel record, N is the number of the plurality of travel records, and k is a nonzero constant.

7. The dedicated navigation device of claim 1, wherein the road condition is determined from the optical image from the camera.

8. A method comprising:

determining, using a hardware measurement circuit, travel parameters comprising a current speed limit, current weather, a current road condition, current traffic, a current time of day, and a current schedule anxiety, wherein the current speed limit is measured using a global positioning system (GPS) to determine a current location and the current speed limit is retrieved from a map for the current location, the current traffic is determined from a camera, the current time of day is determined from a clock, the current weather is determined from an optical image from the camera, a relative arrival time is calculated as an inverse of a late arrival time, wherein the late arrival time is minutes that a specified driver will arrive late, and a current schedule anxiety is calculated as a difference between a nonzero constant value and the relative arrival time;

storing, using a memory, the travel parameters to a travel record of the plurality of travel records each time a specified driver drives to a location;

modifying, using a hardware modification circuit, an arrival time travel estimate based on a driver profile for the specified driver calculated from the travel parameters and the plurality of travel records, the driver profile comprising a speed based on a speed limit, a speed based on weather, a speed based on the road conditions, a speed based on traffic, a speed based on time of day, and a speed based on current schedule anxiety, wherein the speed based on current schedule anxiety SA is calculated as $SA=k*CSL*CA/(\Sigma(SI*AI/N))$ where k is a nonzero constant, CSL is the current speed limit, SI is the speed for a given travel record of a plurality of travel records, CA is the current schedule anxiety, AI is the schedule anxiety for the given travel record, and N is the number of the plurality of travel records;

updating, using the modification circuit, the driver profile in the memory with the current schedule anxiety and the speed based on the current schedule anxiety; and presenting, using a display, the modified arrival time estimate.

9. The method of claim 8, the method further updating, using the modification circuit, the driver profile in response to the travel parameters.

10. The method of claim 8, wherein the arrival time travel estimate is further modified using a modified speed, the modified speed calculated as a function of the speed based on the speed limit, the speed based on the weather, the speed based on the road conditions, the speed based on the traffic, and the speed based on the time of day.

11. The method of claim 10, wherein the speed based on the speed limit SSL is calculated as $SSL=k*CSL*\Sigma(SI/SLI)$ where CSL is the current speed limit, SI is a speed for an ith travel record of the plurality of travel records, SLI is a speed limit for the ith travel record, and k is a nonzero constant.

12. The method of claim 10, wherein the speed based on the weather SW is calculated as $SW=k*CSL*CW/(\Sigma(SI*WI/N))$, where CSL is the current speed limit, CW is the current weather, SI is a speed for an ith travel record of the plurality of travel records, WI is a weather for the ith travel record, N is a number of the plurality of travel records, and k is a nonzero constant.

13. The method of claim 10, wherein the speed based on the road conditions SR is calculated as $SR=k*CSL*CR/(\Sigma(SI*RI/N))$, where CSL is the current speed limit, CR is the current road condition, SI is a speed for an ith travel record of the plurality of travel records, RI is a road condition for the ith travel record, N is the number of the plurality of travel records, and k is a nonzero constant.

14. The method of claim 8, wherein the road condition is determined from the optical image from the camera.

15. A system comprising:
a server;
a dedicated navigation device in communication with the server and comprising:
a display;
a global positioning system (GPS);
a memory storing maps and a plurality of travel records;
a clock;
a camera;
a hardware measurement circuit that determines travel parameters comprising a current speed limit, current weather, a current road condition, current traffic, a current time of day, and a current schedule anxiety, wherein the current speed limit is measured using the GPS to determine a current location and the current speed limit is retrieved from the map for the current location, the current traffic is determined from the camera, the current time of day is determined from the clock, the current weather is one of determined from an optical image from the camera and downloaded from the server, a relative arrival time is calculated as an inverse of a late arrival time, wherein the late arrival time is minutes that a specified driver will arrive late, and a current schedule anxiety is calculated as a difference between a nonzero constant value and the relative arrival time;
the memory stores the travel parameters to a travel record of the plurality of travel records each time a specified driver drives to a location;
a hardware modification circuit that modifies an arrival time travel estimate based on a driver profile for the specified driver calculated from the travel parameters and the plurality of travel records, the driver profile comprising a speed based on a speed limit, a speed based on weather, a speed based on the road conditions, a speed based on traffic, a speed based on time of day, and a speed based on current schedule anxiety, wherein the speed based on current schedule anxiety SA is calculated as $SA = k \cdot CSL \cdot CA / (\Sigma(SI \cdot AI/N))$ where k is a nonzero constant, CSL is the current speed limit, SI is the speed for a given travel record of a plurality of travel records, CA is the current schedule anxiety, AI is the schedule anxiety for the given travel record, and N is the number of the plurality of travel records;
the modification circuit further updates the driver profile in the memory with the current schedule anxiety and the speed based on the current schedule anxiety; and
the display presents the modified arrival time estimate.

16. The system of claim 15, wherein the modification circuit further updates the driver profile in response to the travel parameters.

17. The system of claim 15, wherein the arrival time travel estimate is further modified using a modified speed, the modified speed calculated as a function of the speed based on the speed limit, the speed based on the weather, the speed based on the road conditions, the speed based on the traffic, and the speed based on the time of day.

18. The system of claim 17, wherein the speed based on the speed limit SSL is calculated as $SSL = k \cdot CSL \cdot \Sigma(SI/SLI)$ where CSL is the current speed limit, SI is a speed for an ith travel record of the plurality of travel records, SLI is a speed limit for the ith travel record, and k is a nonzero constant.

19. The system of claim 17, wherein the speed based on the weather SW is calculated as $SW = k \cdot CSL \cdot CW / (\Sigma(SI \cdot WI/N))$, where CSL is the current speed limit, CW is the current weather, SI is a speed for an ith travel record of the plurality of travel records, WI is a weather for the ith travel record, N is the number of the plurality of travel records, and k is a nonzero constant.

20. The system of claim 17, wherein the speed based on the road conditions SR is calculated as $SR = k \cdot CSL \cdot CR / (\Sigma(SI \cdot RI/N))$, where CSL is the current speed limit, CR is the current road condition, SI is a speed for an ith travel record of the plurality of travel records, RI is a road condition for the ith travel record, N is the number of the plurality of travel records, and k is a nonzero constant.

* * * * *